US009276728B2

(12) United States Patent
Lee et al.

(10) Patent No.: US 9,276,728 B2
(45) Date of Patent: Mar. 1, 2016

(54) INTERFERENCE AVOIDANCE-BASED COMMUNICATION APPARATUS AND METHOD

(71) Applicant: Electronics and Telecommunications Research Institute, Daejeon (KR)

(72) Inventors: Joon Soo Lee, Yongin (KR); Hong Soog Kim, Daejeon (KR); Je Hun Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 14/216,393

(22) Filed: Mar. 17, 2014

(65) Prior Publication Data
US 2014/0334396 A1 Nov. 13, 2014

(30) Foreign Application Priority Data

May 8, 2013 (KR) .......................... 10-2013-0051983

(51) Int. Cl.
*H04B 1/00* (2006.01)
*H04L 5/00* (2006.01)
*H04W 4/00* (2009.01)

(52) U.S. Cl.
CPC .............. *H04L 5/0062* (2013.01); *H04W 4/008* (2013.01)

(58) Field of Classification Search
CPC .............................. H04L 5/0062; H04W 4/008
See application file for complete search history.

(56) References Cited

U.S. PATENT DOCUMENTS

| 8,934,377 | B2* | 1/2015 | Kumar ................ H04L 47/2425 370/254 |
| 2004/0185861 | A1* | 9/2004 | Domon et al. ................ 455/450 |
| 2005/0122999 | A1* | 6/2005 | Scherzer et al. .............. 370/480 |
| 2008/0045152 | A1* | 2/2008 | Boes .......................... 455/63.1 |
| 2009/0103474 | A1* | 4/2009 | Lu et al. ........................ 370/328 |
| 2013/0035128 | A1* | 2/2013 | Chan et al. .................... 455/513 |
| 2013/0252653 | A1* | 9/2013 | Aragon ......................... 455/509 |
| 2014/0126403 | A1* | 5/2014 | Siomina ........................ 370/252 |
| 2014/0314003 | A1* | 10/2014 | Zhou et al. .................... 370/329 |
| 2014/0348253 | A1* | 11/2014 | Mobasher et al. ............ 375/267 |

OTHER PUBLICATIONS

Weighted Coloring based Channel Assignment for WLANs: Mishra et al.*

* cited by examiner

*Primary Examiner* — Jay P Patel

(57) ABSTRACT

Provided is an interference avoidance-based communication apparatus and method, the apparatus including an interface to receive operating channel number information transmitted by another communication apparatus in response to an event occurring in the other communication apparatus, and a processor to verify a current use channel of the other communication apparatus based on the received operating channel information, allocate a first weighted value to a remaining channel, aside from the verified current use channel and a second weighted value to the verified current use channel, and generate channel map information for use in hop selection based on the remaining channel to which the first weighted value is allocated and the current use channel to which the second weighted value is allocated.

14 Claims, 4 Drawing Sheets

FIG. 5

| Bit | Information |
|---|---|
| 0:3 | Current WLAN operating channel number |
| 4:5 | Indication of channel width change operation |
| 6:6 | Indication of 5GHz bandwidth operation |

INTERFERENCE AVOIDANCE-BASED COMMUNICATION APPARATUS AND METHOD

CROSS-REFERENCE TO RELATED APPLICATION

This application claims the priority benefit of Korean Patent Application No. 10-2013-0051983, filed on May 8, 2013, in the Korean Intellectual Property Office, the disclosure of which is incorporated herein by reference.

BACKGROUND

1. Field of the Invention

The present invention relates to a communication apparatus and method for operating to avoid inter-channel interference with another communication apparatus.

2. Description of the Related Art

A Bluetooth apparatus is subjected to operate in 2.4 gigahertz industrial, scientific, and medical (ISM) bands. Thus, when an Institute of Electrical and Electronics Engineers (IEEE) 802.11-based wireless local area network (WLAN) apparatus operates at 2.4 gigahertz (GHz), mutual interference between the Bluetooth apparatus and the WLAN apparatus may occur.

Available channels of the IEEE 802.11 standard may be defined in a 2.4 GHz band. Each of the available channels may have a width of 20 megahertz (MHz) and partially overlap.

In a Bluetooth standard, 79 channels for communication in the 2.4 GHz band may be defined. A range of frequency used for the channels may be from 2.402 GHz to 2.480 GHz, and each of the channels may be separated based on a 1 MHz unit.

A signal transmitted by the Bluetooth apparatus may be spread to the 2.4 GHz band and perform frequency hopping, for example, 1600 times per second to avoid interference with another wireless communication apparatus.

A bandwidth of a single channel of the IEEE 802.11 standard may correspond to bandwidths of 20 Bluetooth channels. Thus, a frequency channel of the frequency hopping, which is used for a communication by the Bluetooth apparatus, may be subject to interference by a communication of the WLAN apparatus using a channel including a corresponding Bluetooth channel. For example, when the Bluetooth apparatus performs the frequency hopping 1600 times per second, each Bluetooth channel may be used approximately 20 times (1600/79=20.253) per second on average because 79 Bluetooth channels are present.

Accordingly, to minimize interference in a case in which both the Bluetooth apparatus and the WLAN apparatus are present, channel use information may be exchanged between the Bluetooth apparatus and the WLAN apparatus, and a channel use between the Bluetooth apparatus and the WLAN apparatus may be adjusted to avoid interference.

SUMMARY

An aspect of the present invention provides a communication apparatus and method for operating to avoid inter-channel interference with another communication apparatus by verifying a current use channel of the other communication apparatus based on operating channel information received by the other communication apparatus, and generating channel map information for use in hop selection based on a remaining channel, aside from the verified current use channel.

According to an aspect of the present invention, there is provided an interference avoidance-based communication apparatus including an interface to receive operating channel number information transmitted by another communication apparatus in response to an event occurring in the other communication apparatus, and a processor to verify a current use channel of the other communication apparatus based on the received operating channel information, allocate a first weighted value to a remaining channel, aside from the verified current use channel and a second weighted value to the verified current use channel, and generate channel map information for use in hop selection based on the remaining channel to which the first weighted value is allocated and the current use channel to which the second weighted value is allocated.

According to another aspect of the present invention, there is also provided an interference avoidance-based communication method including receiving operating channel information transmitted by another communication apparatus in response to an event occurring in the other communication apparatus, verifying a current use channel of the other communication apparatus based on the received operating channel information and allocating a first weighted value to a remaining channel, aside from the verified current use channel and a second weighted value to the verified current use channel, and generating channel map information for use in hop selection based on the remaining channel to which the first weighted value is allocated and the current use channel to which the second weighted value is allocated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 is a diagram illustrating an example of operating channel information for use in an interference avoidance-based communication apparatus according to an embodiment of the present invention.

DETAILED DESCRIPTION

Figure 1:
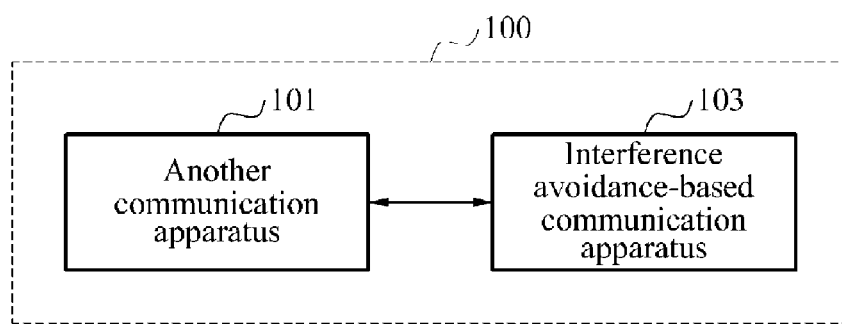
FIG. 1 is a block diagram illustrating a configuration of an interference avoidance-based communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of an interference avoidance-based communication system 100 according to an embodiment of the present invention.

Referring to FIG. 1, the interference avoidance-based communication system 100 may include another communication apparatus 101 and an interference avoidance-based communication apparatus 103.

The other communication apparatus 101 may be, for example, a wireless local area network (WLAN) apparatus and operate at 2.4 gigahertz (GHz). In this instance, the other communication apparatus 101 may use, for example, a channel with a width of 20 megahertz (MHz). Here, the channel may partially overlap. In addition, the other communication apparatus 101 may use a channel with a width of 40 MHz using two channels adjacent to each other.

The other communication apparatus 101 may transmit operating channel information associated with a use channel that is currently being used by the other communication apparatus 101, to the interference avoidance-based communication apparatus 103 in response to an event occurrence. Hereinafter, the use channel that is currently being used by the other communication apparatus 101 may also be referred to as a current use channel.

The interference avoidance-based communication apparatus 103 may be a heterogeneous apparatus, for example, a Bluetooth apparatus as compared to the other communication apparatus 101. The interference avoidance-based communication apparatus 103 may operate at, for example, 2.4 GHz. For example, the interference avoidance-based communication apparatus 103 may operate at a frequency between 2.402 GHz and 2.480 GHz. In this instance, the interference avoidance-based communication apparatus 103 may use, for example, 79 channels, each having a width of 1 MHz.

The interference avoidance-based communication apparatus 103 may receive the operating channel information transmitted from the other communication apparatus 101, in response to an event occurring in the other communication apparatus 101. Based on the received operating channel information, the interference avoidance-based communication apparatus 103 may verify the current use channel of the other communication apparatus 101. The interference avoidance-based communication apparatus 103 may allocate a first weighted value to a remaining channel, aside from the verified current use channel among all available channels, and allocate a second weighted value to the verified current use channel. Here, the second weighted value is less than the first weighted value. The interference avoidance-based communication apparatus 103 may generate channel map information for use in a hop selection using the remaining channel to which the first weighted value is allocated and the current use channel to which the second weighted value is allocated. Based on the channel map information, the interference avoidance-based communication apparatus 103 may select a set number of channels, for example, 20 channels, and perform a frequency hopping operation using the selected channels. Thus, for example, in a communication with a communication apparatus (not shown) corresponding to a homogeneous apparatus, the interference avoidance-based communication apparatus 103 may operate to avoid inter-channel interference with the other communication apparatus 101 corresponding to a heterogeneous apparatus. In this instance, the interference avoidance-based communication apparatus 103 may select the set number of channels having a relatively greater weighted value from among the remaining channel and the current use channel.

Figure 2:
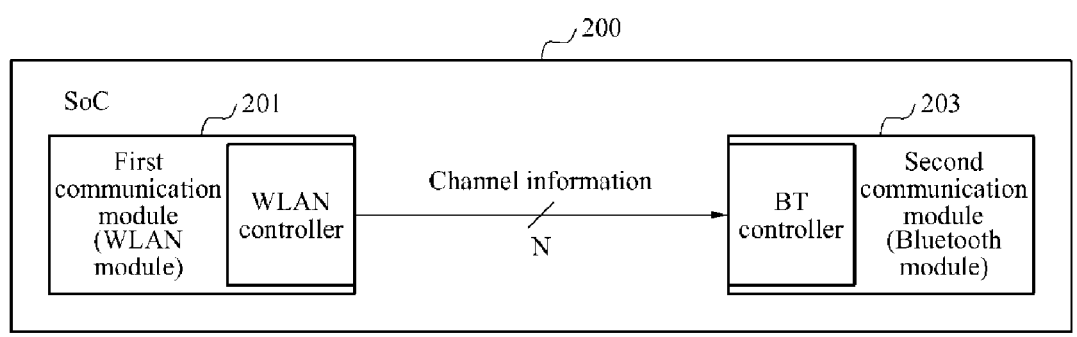
FIG. 2 is a block diagram illustrating an example of an interference avoidance-based communication system according to an embodiment of the present invention.

FIG. 2 is a diagram illustrating an example of an interference avoidance-based communication system 200 according to an embodiment of the present invention.

Referring to FIG. 2, the interference avoidance-based communication system 200 may be configured in a form of a system on chip (SoC). In this instance, the interference avoidance-based communication system 200 may include a first communication module 201 as another communication apparatus and a second communication module 203 as an interference avoidance-based communication apparatus.

The first communication module 201 may include a WLAN controller as, for example, a WLAN module. The first communication module 201 may transmit, to the second communication module 203, operating channel information associated with a current use channel of the first communication module 201 based on a control of the WLAN controller.

The second communication module 203 may include a Bluetooth controller as, for example, a Bluetooth module. According to a control of the Bluetooth controller, the second communication module 203 may generate or update channel map information for use in hop selection based on the operating channel information received from the first communication module 201.

Figure 3:
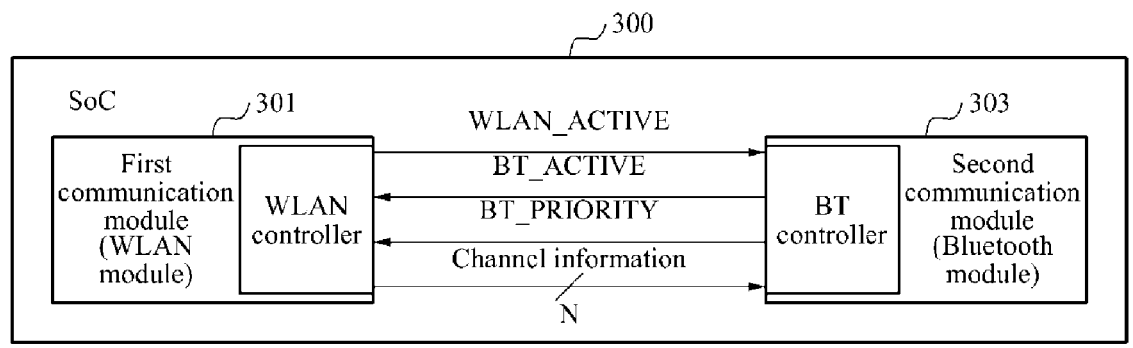
FIG. 3 is a block diagram illustrating another example of an interference avoidance-based communication system according to an embodiment of the present invention.

Referring to FIG. 3, an interference avoidance-based communication system 300 may include a first communication module 301 and a second communication module 303 transmitting and receiving the operating channel information based on packet traffic arbitration (PTA). In particular, the first communication module 301 may transmit a WLAN_ACTIVE signal to the second communication module 303. The second communication module 303 may receive the WLAN_ACTIVE signal and sequentially transmit a Bluetooth active (BT_ACTIVE) and a Bluetooth priority (BT_PRIORITY). The first communication module 301 may sequentially receive the BT_ACTIVE and the BT_PRIORITY, and transmit the operating channel information associated with the current use channel of the first communication module 301, to the second communication module 303.

Figure 4:
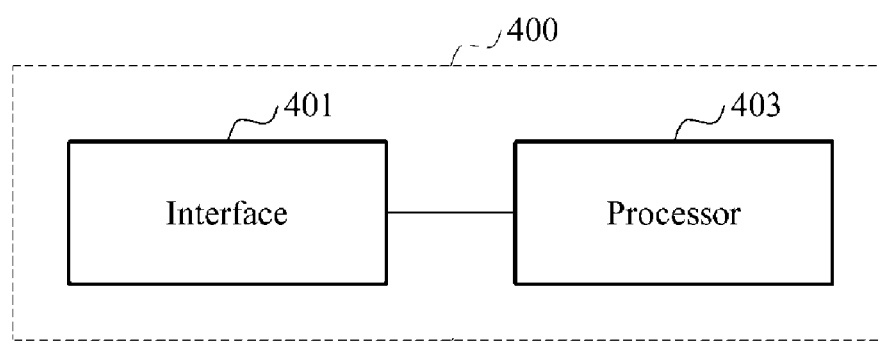
FIG. 4 is a block diagram illustrating a configuration of an interference avoidance-based communication apparatus according to an embodiment of the present invention.

FIG. 4 is a diagram illustrating a configuration of an interference avoidance-based communication apparatus 400 according to an embodiment of the present invention.

Referring to FIG. 4, the interference avoidance-based communication apparatus 400 may correspond to, for example, a Bluetooth apparatus and include an interface 401 and a processor 403.

The interface 401 may receive operating channel information transmitted from the other communication apparatus, in response to an event occurring in another communication apparatus, for example, a WLAN apparatus.

Here, when a case in which the other communication apparatus is initialized or a use channel that has previously been used by the other communication apparatus is changed to a current use channel occurs as the event, the operating channel information may be transmitted by the other communication apparatus. Hereinafter, the use channel that has previously been used by the other communication apparatus may also be referred to as a previous use channel. In this instance, the case in which the previous use channel used by the other communication apparatus is changed to the current use channel may include a case in which identification information included in the previous use channel is changed, for example, from a channel 1 to a channel 2, a case in which a bandwidth of the previous use channel is changed, for example, from 20 MHz to 40 MHz, or a case in which a frequency band of the previous use channel is changed, for example, from 2.4 GHz to 5 GHz.

The operating channel information may be associated with the current use channel of the other communication apparatus, and include at least one of identification information associated with a primary channel, indication information associated with a secondary channel, and whether a frequency band of the current use channel is to be changed.

For example, when the interference avoidance-based communication apparatus 400 corresponds to a master node in a network, the processor 403 may generate channel map information based on the received operating channel information.

In particular, the processor 403 may verify the current use channel of the other communication apparatus based on the received operating channel information. Then, the processor 403 may allocate a first weighted value to a remaining channel, aside from the verified current use channel and a second weighted value to the verified current use channel, and generate channel map information for use in hop selection based on the remaining channel to which the first weighted value is allocated and the current use channel to which the second weighted value is allocated. In this instance, the processor may allocate, to the current use channel, the second weighted value less than the first weighted value.

In addition, the processor 403 may allocate, to the current use channel, "0" as the second weighted value to generate the channel map information using the remaining channel, aside from the current use channel.

As an example, in a communication with a heterogeneous communication apparatus, for example, a Bluetooth apparatus using an adaptive frequency hopping (AFH) algorithm, the processor 403 may communicate by selecting a channel having a relatively high weight value based on the channel map information so as to operate to avoid inter-channel interference with a heterogeneous communication apparatus, for example, the WLAN apparatus.

When the interference avoidance-based communication apparatus 400 corresponds to a slave mode in a network, the processor 403 may transfer the operating channel information to the master node in the network such that the channel map information is generated in the master mode. Thus, the processor 403 may enable the master node to operate based on the channel map information, thereby avoiding the inter-channel interference with the other communication apparatus.

The other communication apparatus and the interference avoidance-based communication apparatus 400 may be included in an SoC as a first communication module and a second communication module. Here, the first communication module and the second communication module may transmit and receive the operating channel information through a wired line.

FIG. 5 is a diagram illustrating an example of operating channel information used by an interference avoidance-based communication apparatus according to an embodiment of the present invention.

Referring to FIG. 5, operating channel information that is generated by another communication apparatus and transmitted to the interference avoidance-based communication apparatus may be associated with a current use channel of the other communication apparatus, and include at least one of identification information associated with a primary channel, indication information associated with a secondary channel, and whether the frequency band of the current use channel is to be changed.

The operating channel information may refer to channel information associated with the current use channel of the other communication apparatus, and include, for example, seven bits. Here, 0:3 bits may indicate the identification information associated with the primary channel. 4:5 bits may correspond to the indication information associated with the secondary channel and indicate that the secondary channel is present in either of the two-way based on the primary channel. 6:6 bits may correspond to whether a frequency band of the current use channel is changed, for example, from a band of 2.4 GHz to a band of 5 GHz.

Figure 6:
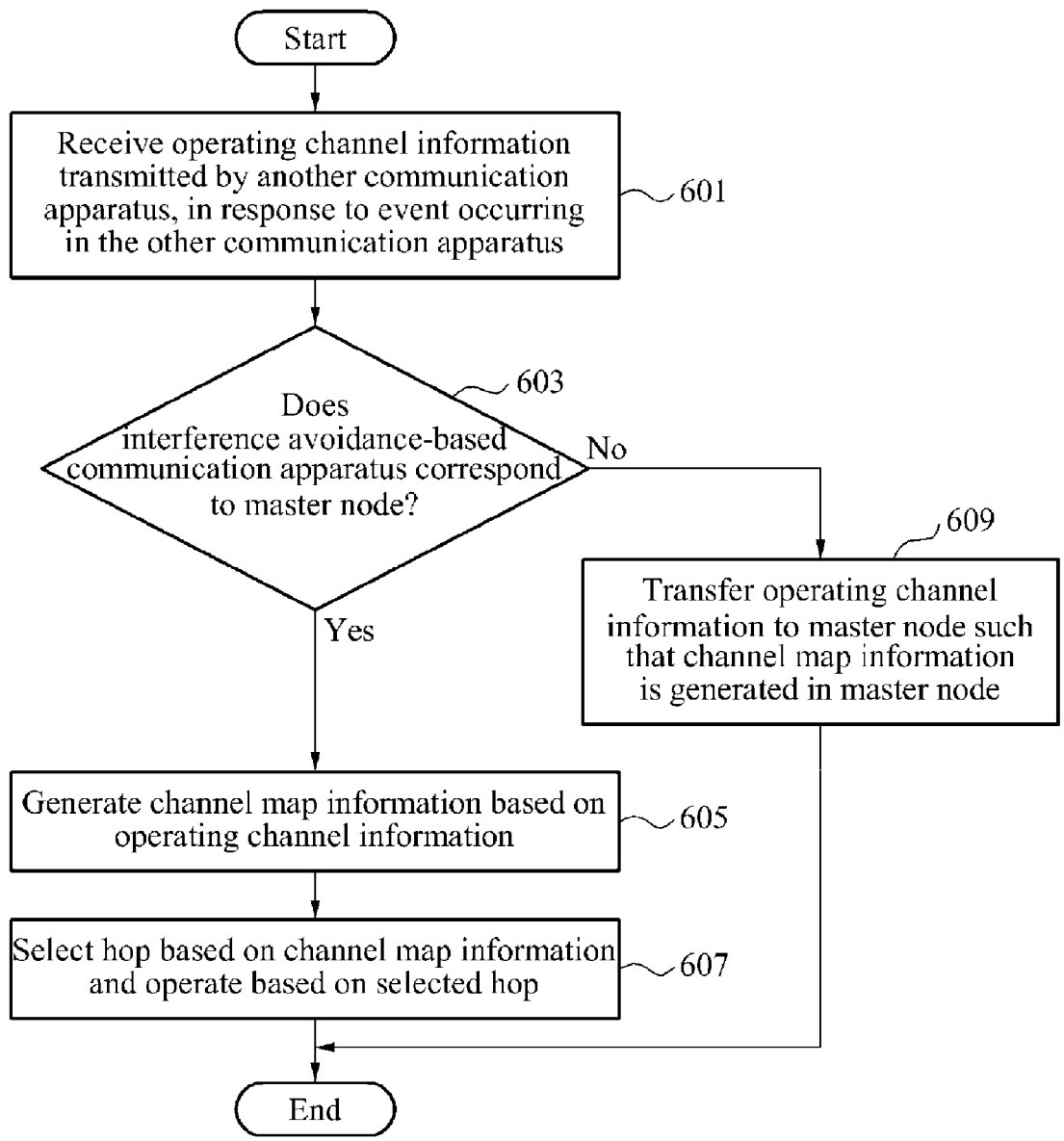
FIG. 6 is a flowchart illustrating an interference avoidance-based communication method according to an embodiment of the present invention.

FIG. 6 is a flowchart illustrating an interference avoidance-based communication method according to an embodiment of the present invention. Here, the interference avoidance-based communication method may be implemented by an interference avoidance-based communication apparatus, for example, a Bluetooth apparatus.

Referring to FIG. 6, in operation 601, the interference avoidance-based communication apparatus may receive operating channel information transmitted by another communication apparatus, in response to an event occurring in the other communication apparatus, for example, a WLAN apparatus.

Here, when a case in which the other communication apparatus is initialized or a previous use channel of the other communication apparatus is changed to the current use channel occurs as the event, the operating channel information is transmitted by the other communication apparatus. In this instance, the case in which the previous use channel used by the other communication apparatus is changed to the current use channel may include a case in which identification information included in the previous use channel is changed, a case in which a bandwidth of the previous use channel is changed, or a case in which a frequency band of the previous use channel is changed.

The operating channel information may be associated with the current use channel of the other communication apparatus, and include at least one of identification information associated with a primary channel, indication information associated with a secondary channel, and whether a frequency band of the current use channel is to be changed.

In operation 603, the interference avoidance-based communication apparatus may verify whether the interference avoidance-based communication apparatus corresponds to a master node in a network.

In operation 605, when a result of the verifying indicates that the interference avoidance-based communication apparatus corresponds to the master node, the interference avoidance-based communication apparatus may generate channel map information for use in a hop selection. In this instance, the interference avoidance-based communication apparatus may verify the current use channel of the other communication apparatus, based on the operating channel information and generate the channel map information for use in a hop selection based on a remaining channel, aside from the verified current use channel among all available channels.

For example, the interference avoidance-based communication apparatus may allocate a first weighted value to the remaining channel and a second weighted value to the verified current use channel, and generate the channel map information for use in hop selection based on the remaining channel to which the first weighted value is allocated and the current use channel to which the second weighted value is allocated. Here, the second weighted value is less than the first weighted value.

In addition, the interference avoidance-based communication apparatus may allocate, to the current use channel, "0" as the second weighted value and generate the channel map information using the remaining channel, aside from the current use channel.

In operation 607, the interference avoidance-based communication apparatus may select a hop based on the channel map information, and operate based on the selected hop.

When the result of verifying indicates that the interference avoidance-based communication apparatus does not correspond to the master node, that is, the interference avoidance-based communication apparatus corresponds to a slave node, the interference avoidance-based communication apparatus may transfer the operating channel information to the master node such that the channel map information is generated in the master node in operation 609.

According to embodiments of the present invention, it is possible to provide an interference avoidance-based communication apparatus and method for operating to avoid inter-channel interference with another communication apparatus by verifying a current use channel of the other communication apparatus based on operating channel information received by the other communication apparatus, and generating channel map information for use in a hop selection based on a remaining channel, aside from the verified current use channel.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An interference avoidance-based communication apparatus, comprising:
    an interface to receive operating channel number information transmitted by another communication apparatus in response to an event occurring in the other communication apparatus; and
    a processor to verify a current use channel of the other communication apparatus based on the received operating channel information, allocate a first weighted value to a remaining channel, aside from the verified current use channel and a second weighted value to the verified current use channel, and generate channel map information for use in hop selection based on the remaining channel to which the first weighted value is allocated and the current use channel to which the second weighted value is allocated,
    wherein the processor allocates, to the current use channel, the second weighted value less than the first weighted value, and
    wherein the channel map information is adapted to avoid interference with the other communication apparatus.

2. The apparatus of claim 1, wherein the processor generates the channel map information based on the remaining channel, aside from the current use channel.

3. The apparatus of claim 1, wherein when a case in which the other communication apparatus is initialized or a previous use channel of the other communication apparatus is changed to the current use channel occurs as the event, the operating channel information is transmitted by the other communication apparatus.

4. The apparatus of claim 3, wherein the case in which the previous use channel of the other communication apparatus is changed to the current use channel comprises a case in which identification information included in the previous use channel is changed, a case in which a bandwidth of the previous use channel is changed, or a case in which a frequency band of the previous use channel is changed.

5. The apparatus of claim 1, wherein the operating channel information is associated with the current use channel of the other communication apparatus, and comprises at least one of identification information associated with a primary channel, indication information associated with a secondary channel, and whether a frequency band of the current use channel is to be changed.

6. The apparatus of claim 1, wherein when the interference avoidance-based communication apparatus corresponds to a slave node in a network, the processor transfers the operating channel information to a master node in the network such that the channel map information is generated in the master node.

7. The apparatus of claim 1, wherein the interference avoidance-based communication apparatus and the other communication apparatus are incorporated in a system on chip (SoC) as a first communication module and a second communication module.

8. The apparatus of claim 1, wherein the other communication apparatus corresponds to a wireless local area network (WLAN) apparatus,
wherein the interference avoidance-based communication apparatus corresponds to a Bluetooth apparatus.

9. An interference avoidance-based communication method, comprising:
receiving operating channel information transmitted by another communication apparatus in response to an event occurring in the other communication apparatus;
verifying a current use channel of the other communication apparatus based on the received operating channel information and allocating a first weighted value to a remaining channel, aside from the verified current use channel and a second weighted value to the verified current use channel; and
generating channel map information for use in hop selection based on the remaining channel to which the first weighted value is allocated and the current use channel to which the second weighted value is allocated,
wherein the allocating comprises allocating, to the current use channel, the second weighted value less than the first weighted value, and
wherein the channel map information is adapted to avoid interference with the other communication apparatus.

10. The method of claim 9, wherein the generating comprises generating the channel map information based on the remaining channel, aside from the current use channel.

11. The method of claim 9, wherein when a case in which the other communication apparatus is initialized or a previous use channel of the other communication apparatus is changed to the current use channel occurs as the event, the operating channel information is transmitted by the other communication apparatus.

12. The method of claim 11, wherein the case in which the previous use channel of the other communication apparatus is changed to the current use channel comprises a case in which identification information included in the previous use channel is changed, a case in which a bandwidth of the previous use channel is changed, or a case in which a frequency band of the previous use channel is changed.

13. The method of claim 9, wherein the operating channel information is associated with the current use channel of the other communication apparatus, and comprises at least one of identification information associated with a primary channel, indication information associated with a secondary channel, and whether a frequency band of the current use channel is to be changed.

14. The method of claim 9, further comprising:
transferring the operating channel information to a master node in a network such that the channel map information is generated in the master node when an interference avoidance-based communication apparatus by which the interference avoidance-based communication method is implemented corresponds to a slave node in a network.

* * * * *